Patented Apr. 27, 1954

2,676,976

UNITED STATES PATENT OFFICE 2,676,976

SYNTHESIS OF PANTOTHENIC ACID-4' PHOSPHATE

James Baddiley and Eric Malcolm Thain, London, England, assignors to National Research Development Corporation, London, England, a British corporation No Drawing. Application November 26, 1951, Serial No. 258,307

Claims priority, application Great Britain December 4, 1950

9 Claims. (Cl. 260—461)

This invention relates to a process for the synthesis of N(2',4'-di-hydroxy-3':3'-dimethylbutyro)-β alanine-4' phosphate which is more shortly known as pantothenic acid-4' phosphate and will be referred to as such throughout this specification.

Pantothenic acid, one of the vitamins of the "B" group (Lipmann, Kaplan, Novelli, Tuttle and Guirard, J. Biol. Chem., 1947, 167, 869) is liberated by the hydrolysis of active concentrates of the so-called "coenzyme A" which is a co-factor of general occurrence in certain enzymatic acetylation processes fundamental to the metabolism of living systems. The presence of this co-factor has been shown to be necessary for the acetylation of aromatic amines by liver preparations (Lipmann, Fed. Proc., 1945, 4, 97; J. Biol. Chem., 1945, 160, 173), for the acetylation of choline in brain (Lipmann and Kaplan, J. Biol. Chem., 1946, 162, 743) and in other biological acetylation systems (Stern and Ochoa, J. Biol. Chem., 1949, 179, 491). It has been found that intestinal phosphatase and pigeon liver extracts inactivate coenzyme A with the liberation of pantothenic and phosphoric acids and hence it seems probable that the coenzyme is a phosphorylated derivative of pantothenic acid. Coenzyme A itself stimulates the growth of *Acetobacter suboxydans*, a property which is destroyed by treatment with intestinal phosphatase. The present invention is concerned with the synthesis of pantothenic acid-4' phosphate which it was thought might be identical with the liver extract degradation product of coenzyme A, but since the synthesized phosphate does not stimulate growth of *Acetobacter suboxydans* it would appear that it is not so identical. It has been found, however, to have marked pharmacological effects upon gut in which it causes contraction of the ileum, and it is thought that the product may be found to have considerable medical significance.

According to the invention there is provided a process for the synthesis of pantothenic acid-4' phosphate comprising the steps of reacting pantolactone-(3:3 dimethylbutyro-γ-lactone)- with an alkali metal or an alkoxy derivative thereof, condensing the metallic derivative of pantolactone thus obtained with an aralkyl halide to form a 2'-aralkyl ether of pantolactone, condensing the pantolactone 2'-aralkyl ether with a β alanine derivative containing a free amino group, phosphorylating the resultant ester or "free" acid with a diaryl halogeno-phosphonate to form a 4'-diaryl phosphate of pantothenic acid and treating the 4'-diaryl phosphate to remove the aryl groups and obtain pantothenic acid-4' phosphate. Phosphorylation may be conveniently effected by means of a diaryl-chlorophosphonate and the aryl groups of the diaryl phosphate may be removed by hydrogenolysis or by alkaline hydrolysis. The crude pantothenic acid-4' phosphate produced by this process may be purified and separated from the reaction mixture by, for example, isolation as a metallic salt.

The treatment of the pantolactone may be effected conveniently with an alkoxy metallic derivative such as sodium ethoxide followed by removal of alcohol from the metallic derivative of pantolactone thus formed. The subsequent condensation to form a 2'-aralkyl ether of pantolactone may be effected by heating the metallic derivative of pantolactone in xylene or other convenient and like organic solvent with an aralkyl halide such as, for example, benzyl chloride to form a 2'-benzyl ether. This 2'-benzyl ether may then be isolated in crystalline form from the distillate resulting from the distillation of the reaction mixture under reduced pressure. The pantolactone 2'-benzyl ether may then be reacted with a sodium salt of β alanine and the resulting syrupy ether treated in anhydrous pyridine with diphenyl chlorophosphonate. The phosphate obtained by this latter reaction may then be hydrogenolised to effect removal of the benzyl and phenyl groups so as to produce the pantothenic acid-4' phosphate.

Alternatively, the pantolactonebenzyl ether may be reacted with a benzyl ester of β alanine instead of a sodium salt thereof; phosphorylation and subsequent hydrogenolysis being effected as above described.

In order that the invention may be more readily understood, there follows an example of an experimental synthesis of pantothenic acid-4' phosphate.

EXAMPLE

The synthesis takes place in three reaction stages followed by purification:

(1) *Preparation of 2-benzyloxy-3:3-dimethylbutyro-γ-lactone*

11.8 gms. of pantolactone were added to a solution of (2.09 gms.) sodium in 30 cc. of dry alcohol the solvent being subsequently removed by distillation under reduced pressure. The solid sodium derivative of pantolactone was dried at 90° C. under a pressure of 0.2 mm., powdered under 30 cc. of dry xylene and the suspension boiled under reflux with 11.5 gms. of benzyl chloride for 2 hours. The cooled solution was then washed successively with sulphuric acid (20 cc., 2 N) and water, dried with sodium sulphate ($Na_2SO_4$) and the solvent removed by distillation under reduced pressure. On distillation in a short path still the residual oil yielded the benzyl ether (14.5 gms. 72% yield, B. P. 100–110° C. at a pressure of 10-2 mm. or 80° C. at a pressure of 10-4 mm.) as a crystalline solid, M. P. 46–47° C.

(2) *Preparation of pantothenic acid-2' benzyl ether*

0.44 gm. of sodium β alanine and 0.5 gm. of kieselguhr were ground together and the intimate mixture thereof dried over phosphorus pentoxide. 0.88 gm. of the benzyl ether from stage 1 was added and the mixture heated at 120° C. for 2 hours. The pasty mass which solidified on cooling was triturated with ether and water and filtered from silica. The ether layer, on evaporation, yielded 0.12 gm. of unchanged benzyl ether which crystallised on standing. The aqueous layer was acidified to Congo red with hydrochloric acid and extracted with ethyl acetate. The organic layer was washed with water, dried with sodium sulphate ($Na_2SO_4$) and evaporated. Slightly impure pantothenic acid-2' benzyl ether remained as a pale yellow syrup (1.05 g., 85% yield).

(3) *Preparation of crude pantothenic acid-4' phosphate as the barium salt*

3.1 gms. (1.1 mol) of diphenyl chlorophosphonate in 8 cc. of anhydrous pyridine were added dropwise to a solution of 1 mol pantothenic acid-2' benzyl ether (3.25 g.) in 10 cc. of pyridine cooled to −10° C. The reaction mixture was maintained at −10° C. for 1 hour and left at normal atmospheric temperature overnight. 1 cc. of water was added and as much pyridine as possible removed by distillation under reduced pressure. The residue was dissolved in chloroform, washed successively with water, dilute hydrochloric acid and water and was then dried with sodium sulphate ($Na_2SO_4$). Evaporation of the chloroform left 5.45 gms. of a viscous, pale yellow syrup. The syrup, without further purification, was hydrogenated in acetic acid solution at normal atmospheric temperature and pressure in the presence of a platinum oxide catalyst. When hydrogen absorption ceased 4.0 gm. barium acetate, dissolved in the minimum amount of water, were added and solvent removed by distillation under reduced pressure. The residue was dissolved in water and the pH of the solution adjusted to 8–9 by the addition of saturated barium hydroxide solution. The small precipitate of barium phosphate was centrifuged off and barium removed quantitatively from the clear supernatant by titration with sulphuric acid using rhodizonic acid indicator. Barium sulphate was removed by centrifugation and the volume of the supernatant reduced by distillation under reduced pressure. Barium hydroxide was added again to pH 8 and the crude phosphate was precipitated by the addition of acetone. The precipitate was washed with acetone, then ether and was finally dried at 100° C.

(4) *Purification of the barium salt from stage 3*

The barium salt was dissolved in water and a saturated solution of lead acetate added until precipitation was complete. The heavy white precipitate was separated by centrifugal action and washed with a little cold water, in which it was appreciably soluble. The precipitate was resuspended in water, lead was precipitated as the sulphide which was removed by centrifugal action and the clear solution was slightly reduced in volume by evaporation under reduced pressure. Barium hydroxide solution was added to pH 9 and the slight excess of alkali removed by passing carbon dioxide through the solution and centrifuging off the precipitated barium carbonate. The clear solution, on diluting with alcohol, yielded the pure barium salt of pantothenic acid-4' phosphate which was washed with alcohol and ether and then dried in a desiccator.

We claim:

1. A process for the synthesis of pantothenic acid 4'-phosphate comprising the steps of intimately contacting pantolactone with an alkali-metal-derivative-forming substance selected from the group consisting of alkali metals and alkali-metal alkoxides in the absence of water, thereby obtaining an alkali-metal derivative of pantolactone; intimately contacting the said alkali-metal derivative with an aralkyl halide in the absence of water, thereby obtaining a pantolactone aralkyl ether; intimately contacting the said aralkyl ether with a beta-alanine derivative containing a free amino group and selected from the class consisting of alkali-metal salts of beta-alanine and aralkyl esters of beta-alanine; intimately contacting the pantothenic-acid derivative resulting from the immediately preceding step with a diaryl halogeno-phosphonate, thereby obtaining a phosphorylated pantothenic-acid derivative; intimately contacting the said phosphorylated pantothenic-acid derivative with a dearylation-dearalkylation reagent; and isolating pantothenic acid 4'-phosphate from the reaction mixture thus obtained.

2. A process as claimed in claim 1 wherein the said alkali-metal-derivative-forming substance is sodium ethoxide.

3. A process as claimed in claim 1 wherein the said aralkyl halide is benzyl chloride.

4. A process claimed in claim 1 wherein the said β-alanine derivative is a sodium salt of β-alanine.

5. A process as claimed in claim 1 wherein the said β-alanine derivative is a benzyl ester of β-alanine.

6. A process as claimed in claim 1 wherein the said diaryl-halogeno-phosphonate is diphenyl-chlorophosphonate.

7. A process as claimed in claim 1 wherein the dearalkylation-dearylation reagent is a hydrogenolysis-reagent.

8. A process as claimed in claim 1 wherein the dearalkylation-dearylation reagent is an alkaline hydrolysis-reagent.

9. A process as claimed in claim 1 wherein the pantothenic acid-4' phosphate is isolated as a metallic salt.

References Cited in the file of this patent

Wooley, J. Biol. Chem., vol. 134, pages 461-2 (1940).